United States Patent [19]
Hildreth

[11] Patent Number: 5,281,766
[45] Date of Patent: Jan. 25, 1994

[54] MOTOR LEAD WIRE

[75] Inventor: Nelson Hildreth, Colchester, Vt.

[73] Assignee: Champlain Cable Corporation, Colchester, Vt.

[21] Appl. No.: 925,847

[22] Filed: Aug. 7, 1992

[51] Int. Cl.⁵ .............................................. H01B 7/00
[52] U.S. Cl. ........................ 174/120 R; 174/110 FC; 174/110 PM; 174/120 SR
[58] Field of Search ...... 174/120 R, 120 SR, 110 FC, 174/110 PM

[56] References Cited

U.S. PATENT DOCUMENTS

| | | | |
|---|---|---|---|
| 3,269,862 | 8/1966 | Lanza et al. | 174/120 SR |
| 3,546,014 | 12/1970 | Nicodemus | 174/120 SR |
| 4,260,661 | 4/1981 | Walters et al. | 174/110 PM X |
| 5,059,483 | 10/1991 | Lunk et al. | 174/120 SR X |

*Primary Examiner*—Morris H. Nimmo
*Attorney, Agent, or Firm*—Salzman & Levy

[57] ABSTRACT

The present invention features a new lead wire for use with class F motors, coils and transformers. The new motor lead wire has the UL-required temperature rating of at least 150° C. and a voltage rating of approximately 600 volts. The lead wire is characterized by a thinner and less costly insulative construction. The motor lead wire has a conductive core member that is overcoated with a primary insulation layer of polyolefin. The polyolefin layer is of a reduced thickness, generally below the standard 30 mils. The polyolefin insulation thickness can be reduced by half, to about 15 mils. This reduced insulation layer is then protected with a jacket of polyvinylidene fluoride or a polyvinylidene fluoride copolymer having an approximate maximum thickness of 0.005 inches. The primary insulation is cross-linked and stabilized with zinc salt of methylmercaptobenzimidazole and a hindered phenol oxidant.

11 Claims, 1 Drawing Sheet

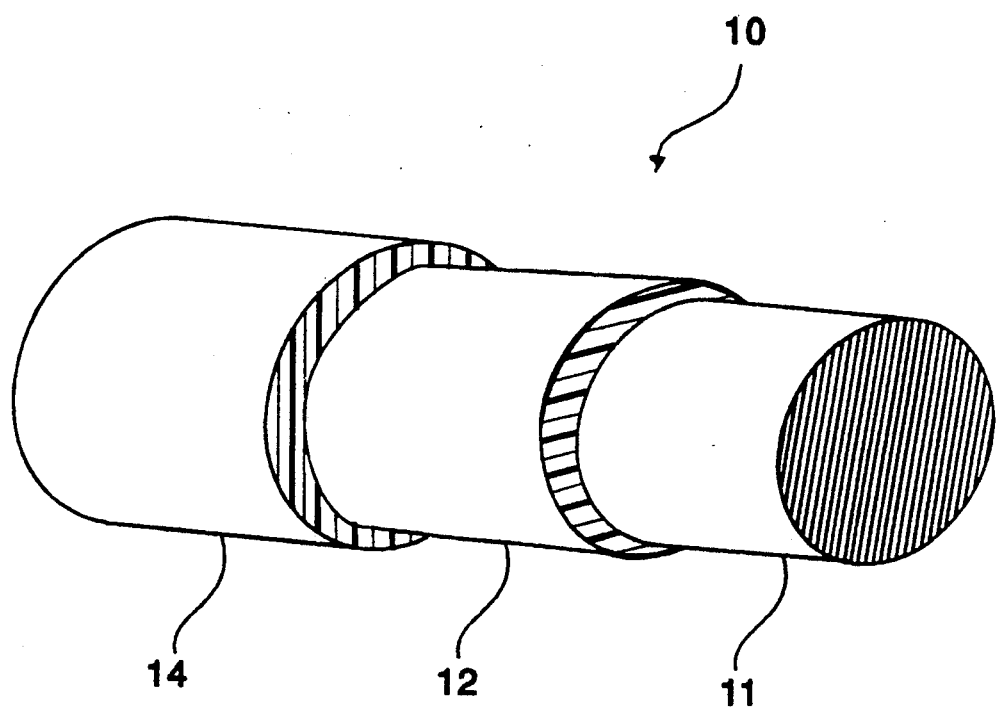
The Figure

MOTOR LEAD WIRE

FIELD OF THE INVENTION

The present invention relates to wire used in standard class F motors, and, more particularly, to a class F motor lead wire that is thinner, less expensive and provides better performance than that currently available.

BACKGROUND OF THE INVENTION

Class F motor lead wires are manufactured to conform to UL specifications subject 758, such as Style 3289, which specifies a 600-volt rating and 150° C. temperature rating. The cables are approved by UL for use as motor leads or internal wiring of appliances.

Present UL standard class F motor lead wires, having Average Wire Gauges (AWGs) 9 through 30, have an insulation wall thickness of 0.030 inches. Larger-sized wires require greater wall thicknesses, as shown below:

| CONDUCTOR SIZE (AWG) | MINIMUM AVERAGE INSULATION THICKNESS (MILS) |
|---|---|
| 30-9 | 30 |
| 8 | 45 |
| 7-2 | 60 |
| 1-0000 | 80 |

The insulation used on these lead wires is generally a cross-linked polyolefin. The insulations are usually connected to the stator of the motor; they are subjected to a varnish bake process, which comprises a polyester or epoxy base. The insulations are usually coated with a releasing agent, such as Vydax (fluorotelomer dispersion), to protect them from the varnish. They can also be protected by either a fluorocarbon or silicone rubber sleeve.

One problem associated with the above wire construction is the failure to adequately protect the insulation from the varnish. Due to inadequate coating or sleeving, there is a resultant sticking of the varnish to the lead wire, which then often causes the lead wire to crack upon bending.

Another fabrication problem observed with the above-mentioned process is the possible migration of the antioxidant to the insulation surface. Migrating antioxidant prevents the hardening of the varnish during the bake cycle; hence, the uncured varnish will thereafter remain tacky.

The present invention has modified the above wire fabrication process to eliminate the two cited problems. The instant invention also provides a construction having a thinner and less costly insulation.

SUMMARY OF THE INVENTION

In accordance with the present invention, there is provided a new class F motor lead wire for use with motors, coils and transformers. The new motor lead wire has the requisite temperature rating of at least 150° C. and voltage rating of approximately 600 volts. The lead wire is characterized by a thinner and less costly insulative construction. The motor lead wire has a conductive core member that is overcoated with a primary insulation layer of polyolefin. The polyolefin layer is of a reduced thickness, generally below the standard 30 mils. The polyolefin insulation thickness can be reduced by half, to about 15 mils. This reduced insulation protected with a jacket of polyvinylidene fluoride or a polyvinylidene fluoride copolymer having an approximate maximum thickness of 0.005 inches. The primary insulation is cross-linked and stabilized with zinc salt of methylmercaptobenzimidazole and a hindered phenol oxidant.

It is an object of the present invention to provide an improved class F motor lead wire.

It is another object of this invention to provide a class F motor lead wire having thinner insulation thickness, lower cost and improved performance.

It is still another object of the invention to eliminate the problematical varnish difficulties associated with class F motor lead wire fabrication.

BRIEF DESCRIPTION OF THE DRAWINGS

A complete understanding of the present invention may be obtained by reference to the accompanying drawing, when considered in conjunction with the subsequent, detailed description, in which the FIGURE illustrates a perspective view of the lead wire construction of this invention.

DESCRIPTION OF THE PREFERRED EMBODIMENT

Generally speaking, the invention features a new construction for class F motor lead wire. The new construction eliminates the problems formerly associated with the varnish-coated insulation construction of the prior art. The invention provides a composite insulation layer that is thinner overall and less costly to produce than that which is currently available.

Now referring to the FIGURE, a lead wire 10 of this invention, is illustrated. The wire is a lead wire for use in class F motors, coils and transformers. The lead wire 10 has a temperature rating of at least 150° C., and a voltage rating of 600 volts.

The lead wire 10 comprises a conductive core member 11 consisting of a copper wire. The conductive core member 11 is overcoated with a primary insulation layer 12. The layer 12 comprises cross-linked polyolefin that is stabilized with zinc salt of methylmercaptobenzimidazole and a hindered phenol antioxidant. The thickness of the primary insulation layer is below 30 mils, and is preferably about 15 mils.

The primary insulation layer 12 is overlaid with an insulation jacket 14 of polyvinylidene fluoride or a polyvinylidene fluoride copolymer having a thickness of about 0.005 inches. The jacket 14 is generally extruded over the primary insulation layer 12.

The aforesaid lead wire 10 of the invention eliminates the troublesome varnish process and has a thinner insulation thickness overall. The inventive lead wire 10 is less costly to produce than the former class F motor lead wire of the prior art.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A lead wire for use with motors, coils and transformers having a temperature rating of at least 150° C. and a voltage rating of at least 600 volts, comprising:
   a conductive core member;
   a layer of primary insulation disposed over said conductive core member, said primary insulation comprising a cross-linked polyolefin having a thickness below 30 mils, that is temperature-stabilized with zinc salt of methylmercaptobenzimidazole and a hindered phenol antioxidant; and
   an insulative jacket disposed over said layer of primary insulation, said insulative jacket comprising polyvinylidene fluoride or a polyvinylidene fluoride copolymer.

2. The lead wire in accordance with claim 1, wherein said insulative jacket is approximately 0.005 inches thick.

3. The lead wire in accordance with claim 1, wherein said primary insulation layer is approximately 15 mils thick.

4. The lead wire in accordance with claim 2, wherein said cross-linked polyolefin has an approximate thickness of 15 mils.

5. The lead wire in accordance with claim 3, wherein said insulative jacket is approximately 0.005 inches thick.

6. A lead wire for use with motors, coils and transformers, having a temperature rating of at least 150° C. and a voltage rating of at least 600 volts, comprising:
   a conductive core member;
   a layer of primary insulation disposed over said conductive core member, said primary insulation comprising a cross-linked polyolefin having an approximate thickness of 15 mils, that is temperature-stabilized with zinc salt of methylmercaptobenzimidazole and a hindered phenol antioxidant; and
   an insulative jacket disposed over said layer of primary insulation, said insulative jacket comprising polyvinylidene fluoride or a polyvinylidene fluoride copolymer, said insulative jacket having an approximate thickness of 0.005 inches.

7. A lead wire for use with motors, coils and transformers, having a temperature rating of at least 150° C. and a voltage rating of at least 600 volts, comprising:
   a conductive core member;
   a layer of primary insulation disposed over said conductive core member, said primary insulation comprising a cross-linked polyolefin having an approximate thickness below 80 mils, that is temperature-stabilized with zinc salt of methylmercaptobenzimidazole and a hindered phenol antioxidant; and
   an insulative jacket disposed over said layer of primary insulation, said insulative jacket comprising a fluoro-polymer or a fluoro-copolymer.

8. The lead wire in accordance with claim 7, wherein said conductive core member is 1 to 0000 AWG.

9. The lead wire in accordance with claim 7, wherein said layer of primary insulation has an approximate thickness below 60 mils and said conductive core member is 7 to 2 AWG.

10. The lead wire in accordance with claim 7, wherein said layer of primary insulation has an approximate thickness below 45 mils and said conductive core member is 8 AWG.

11. A lead wire for use with motors, coils and transformers, having a temperature rating of at least 150° C. and a voltage rating of at least 600 volts, comprising:
    a conductive core member;
    a layer of primary insulation disposed over said conductive core member, said primary insulation being varnish-free and having an approximate thickness below 80 mils, and being temperature-stabilized with zinc salt of methylmercaptobenzimidazole and a hindered phenol antioxidant; and
    an insulative jacket disposed over said layer of primary insulation, said insulative jacket comprising a fluoro-polymer or a fluoro-copolymer.

* * * * *